United States Patent [19]

Haas

[11] 4,413,109
[45] Nov. 1, 1983

[54] EMBOSSED FILMS OBTAINED FROM ETHYLENE-PROPYLENE COPOLYMERS, AND A PROCESS AND APPARATUS FOR MANUFACTURING THE FILMS

[75] Inventor: Armand Haas, Mazingarbe, France

[73] Assignee: Societe Chimique des Charbonnages-CdF Chimie, Paris La Defense, France

[21] Appl. No.: 245,757

[22] Filed: Mar. 20, 1981

Related U.S. Application Data

[63] Continuation of Ser. No. 232,589, Feb. 9, 1981, abandoned.

[30] Foreign Application Priority Data

Feb. 8, 1980 [FR] France .............................. 80 02748

[51] Int. Cl.³ ...................... B29D 7/14; C08F 210/16
[52] U.S. Cl. .................................. 526/348; 264/280; 264/515; 425/363; 425/376 R; 425/383; 428/156; 525/240
[58] Field of Search ......................... 526/348; 428/156

[56] References Cited

U.S. PATENT DOCUMENTS

| | | | |
|---|---|---|---|
| 3,857,144 | 12/1974 | Bustin | 28/72 R |
| 3,911,187 | 10/1975 | Raley | 428/179 |
| 3,950,480 | 4/1976 | Adams et al. | 264/284 |

FOREIGN PATENT DOCUMENTS

| | | |
|---|---|---|
| 44493 | 9/1963 | Luxembourg . |
| 909326 | 10/1962 | United Kingdom . |
| 1087036 | 10/1967 | United Kingdom . |
| 1355245 | 6/1974 | United Kingdom . |

*Primary Examiner*—Stanford M. Levin
*Attorney, Agent, or Firm*—Finnegan, Henderson, Farabow, Garrett & Dunner

[57] ABSTRACT

An embossed ethylene-propylene copolymer film having a thickness of less than or equal to 24 microns. A method and apparatus for making the film by blow-extruding the ethylene-propylene copolymer into a tubular web, pinching the tubular web between pinch rolls, and embossing the pinched web by passing it between an embossing roll and a pressure roll.

1 Claim, No Drawings

EMBOSSED FILMS OBTAINED FROM ETHYLENE-PROPYLENE COPOLYMERS, AND A PROCESS AND APPARATUS FOR MANUFACTURING THE FILMS

CROSS-REFERENCE TO RELATED APPLICATION

This application is a continuation of application Ser. No. 232,589, filed Feb. 9, 1981, now abandoned, entitled "Embossed Films Obtained from Ethylene-Propylene Copolymers, Their Manufacturing Process and a Facility for Carrying Out the Said Process."

BACKGROUND OF THE INVENTION

The present invention relates to embossed films obtained from ethylene-propylene copolymers, and a process and apparatus for producing the films.

In embossing the film, sunken and relief patterns are formed on the surface of the film. Usually, these patterns are regular, small and shallow. As a result of embossing, the flexibility of the film is increased, and the film is given a texture akin to that of textile fabrics.

In the past, embossed films having a thickness approaching 25 to 30 microns have been obtained by blow-extruding a tubular web from a radical polymerization low-density polyethylene, cutting the tubular web longitudinally into two films having a thickness approaching 25 to 30 microns, and then embossing the two films. The embossing has been conducted by heating the film and then applying the film, by means of a pressure roll, to an embossing roll bearing incised or relief patterns. U.S. Pat. No. 3,950,480 describes such a process wherein the film passes into a heating region, and then onto an embossing roll.

U.S. Pat. No. 3,857,144 describes an embossing method wherein a blow-extruded tubular web is pinched together to form a double film, embossing the double film, and then separating the embossed, double film into its two parts by an air blast. The cold-embossing utilized in this process facilitates the separation. The resulting product is used for making bags.

Similarly, Luxembourg Pat. No. 44,493, and British Pat. No. 909,326 also disclose embossing a double-thickness film obtained from a flattened tubular web. Embossing is effected under conditions that make it easy to separate the double-thickness film into two single-thickness films.

British Pat. No. 1,087,036 discloses embossing a flat film extruded from a mixture of at least two different types of thermoplastic resins.

A major deficiency in the prior art is that it is very difficult under industrial conditions (several hours of uninterrupted blow-extrusion operation) to obtain very thin embossed films (less than 25 microns) from polyethylene films obtained by the radical mechanism.

SUMMARY OF THE INVENTION

The object of the present invention is to provide a solution to the above-discussed disadvantage encountered with the prior art.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

The present invention includes an embossed film comprising an ethylene-propylene copolymer, the embossed film having a thickness of less than or equal to 24 microns. Preferably, the ethylene-propylene copolymer has a density ($\rho$) between 0.900 and 0.935 g/cm$^3$, a melt index of between 0.4 and 2 dg/mn, a proportion (m) of methyl groups between 22 and 62 per 100 carbon atoms, and wherein $\rho$ and m are such that $0.9534 \leq \rho + 0.83m \leq 0.9568$.

In a further preferred embodiment, the embossed film comprises 5 to 40% by weight of a radical ethylene polymer in admixture with 60 to 95% by weight of the ethylene-propylene copolymer.

The present invention also includes a process for making an embossed film comprising:
(a) blow-extruding an ethylene-propylene copolymer into a tubular web having a thickness of less than or equal to 12 microns; and
(b) passing said web between an embossing roll and a pressure roll, the temperature of said web when passing between said rolls ranging from 60° C. to 90° C., so as to obtain an embossed, sealed, double-thickness film having a thickness of less than or equal to 24 microns.

Preferably, the process further comprises passing the web between pinch rolls at a temperature exceeding 60° C. prior to passage between the embossing and pressure rolls, and utilizing the ethylene-propylene copolymer that was described in connection with the embossed film.

In addition to the embossed film and process described above, the present invention also includes an apparatus for making an embossed, sealed, double-thickness film having a thickness of less than or equal to 24 microns and formed by blow-extruding the ethylene-propylene copolymer into a tubular web having a thickness of less than or equal to 12 microns and embossing the web, the apparatus comprising:
(a) extrusion means;
(b) blow-extrusion means downstream from said extrusion means;
(c) embossing means including at least an embossing roll and pressure roll for receiving the web therebetween, the embossing means being adjustably located downstream from the blow-extrusion means; and
(d) means associated with the embossing means for maintaining the web at a temperature ranging from 60° C. to 90° C. as the web passes between the embossing and pressure rolls.

Preferably, the apparatus also comprises pinch roll means located between the blow-extrustion means and the embossing means.

Advantageously, the embossed films of the present invention have an excellent texture, comparable to that of textile fabrics, and greater flexibility thereby making them particularly suitable for the manufacture of baby diapers.

DESCRIPTION OF THE PREFERRED EMBODIMENTS

Reference will now be made in detail to the presently preferred embodiments of the invention. The copolymers that are used in the present invention to obtain embossed films having a thickness of less than or equal to 24 microns are ethylenepropylene copolymers. Preferably, the ethylene propylene copolymer has a density ($\rho$) between 0.900 and 0.935 g/cm³, a melt index between 0.4 and 2 dg/mn, a proportion (m) of methyl groups between 22 and 62 per 1000 carbon atoms, and where $\rho$ and m are such that $0.9534 \leq \rho + 0.83$ m $\leq 0.9568$.

The copolymers are produced by copolymerization of ethylene and propylene in one or more reactors. The reactor is maintained at a temperature ranging from 180° C. to 320° C., and under a pressure ranging from 300 bars to 2,500 bars. The reactor is supplied with a gas flow which, under steady state conditions, includes 65 to 85% by weight ethylene, and 15 to 35% by weight of propylene.

The reactor in which copolymerization is conducted contains a Ziegler-type catalytic system comprising at least one activator selected from the hydrides and organometallic compounds of the Group I to III metals of the Periodic Table, and at least one halogenated transition metal compound. The halogenated transition metal compound comprises a complex compound having the formula $(MCl_a)(MgX_2)_y(AlCl_3)_z(RMgX)_b$, wherein M is titanium or vanadium, X is a halogen, R is a hydrocarbon radical, and $2 \leq a \leq 3$, $2 \leq y \leq 20$, $0 \leq z \leq \frac{1}{3}$, and $0 \leq b \leq 1$.

Preferably, a radical ethylene polymer can be admixed with the ethylene-propylene copolymer prior to extrusion. The admixture can contain 60 to 95% by weight of ethylene-propylene copolymer, with 5 to 40% by weight of the radical ethylene polymer. As used herein and in the appended claims, "radical ethylene polymer" means a product obtained by polymerization of ethylene in the presence of a free radical initiator of ethylene, e.g., oxygen, peroxides, or peresters, and under high temperature (140° to 350° C.) and high pressure (generally 1000 to 4000 bars). In forming the radical ethylene polymer, ethylene can be optionally copolymerized in the presence of a monomer such as, for example, carbon monoxide, ethylenically unsaturated carboxylic acids, esters derived from such acids and from an alcohol with 1 to 8 carbon atoms, maleic anhydride, vinyl acetate, etc. Preferably, the radical ethylene polymer has a melt index ranging from 0.2 to 5 dg/mn.

The ethylene-propylene copolymer (or the admixture of the ethylene-propylene copolymer and the radical ethylene polymer) is formed into a tubular web having a thickness of less than or equal to 12 microns by the use of extrusion means, e.g., an extruder, and blow-extrusion means e.g., a blow-extrusion device.

Adjustably located downstream from the blow-extrusion device is an embossing means. The embossing means includes an embossing roll and a pressure roll, with a nip formed between the two rolls. The embossing roll has patterns formed on its surface, whose size, preferably, ranges from 10 microns to 10 millimeters. Preferably, the extrusion means is located between about 2 and 8 metres from the exit of the blow-extrusion device.

Pinch roll means, e.g., two pinch rolls, can be located between the blow-extrusion means and the embossing means. Advantageously, the use of pinch rolls prevents the loss of blowing air. The temperature of the web on passage between the pinch rolls must be over 60° C., and preferably between 60° and 90° C.

The embossing roll, pressure roll and pinch rolls are substantially the same length as the width of the film. Preferably, the pressure and pinch rolls are rubber-shod. If necessary, the various rolls can include a heat exchange system in order to maintain the required temperatures. For example, means associated with the embossing roll can be provided for maintaining the web at a temperature ranging from 60° C. to 90° C. as the web passes between the embossing and pressure rolls. Such means can take the form of internal coiled tubes in the embossing roll.

Additionally, means to maintain tension in the film can be located downstream from the embossing means, as well as means to take the film up.

As previously discussed, the distance between the blow-extrusion means and the embossing means can range from 2 to 8 meters. With the embossing means so positioned, the tubular web speed can range from 5 to 120 m/mn, thereby yielding between 10 and 300 kg/h. Preferably, the temperature of the tubular web is lowered at the embossing means to between 60° and 90° C. The web speed can be adjusted to affect this reduction in temperature. In the case where there is a high tubular web speed and/or a small distance between the blow-extrusion means and the embossing means, it may be necessary to provide cooling means for the tubular web upstream from the embossing means. Alternatively, in the situation where there is a low web speed and/or a large distance between the blow-extrusion means and embossing means, it may be necessary to provide the embossing roll and/or pressure roll with heating means.

The film that exits from the embossing means is a sealed, embossed, double-thickness film having a thickness of less than or equal to 24 microns. The film is double-thickness inasmuch as the tubular web is sealed during the embossing step. Preferably, the embossments on the film range from 10 microns to 10 millimeters. If desired, the film can be wound up at a take-up station and stored.

The following examples further illustrate preferred embodiments of the present invention. The examples should in no way be considered limiting, but merely illustrative of the various features of the present invention.

EXAMPLE 1

A copolymer is obtained by copolymerizing 85% by weight ethylene with 15% by weight propylene in the presence of a Ziegler catalyst. The resulting copolymer has a density of 0.934 g/cm³, a melt index of 0.8 dg/mn (measured according to ASTM specification D-1238-73), a proportion of methyl groups of 25%. (determined by infra-red spectroscopy), a number average molecular weight of 11,500, and a ratio of weight average molecular weight (Mw) to number average molecular weight (Mn) of 13.9.

The aforementioned copolymer, to which is added 6% by weight of titanium dioxide, is blow-extruded into a tubular web having a thickness of 7.5 microns at a speed of 25 m/mn. The temperature of the tubular web at the outlet of the tubular die of the blow-extrusion device is 180° C. The tubular web then passes between two rubber-shod pinch rolls equipped with internal coiled tubes thereby permitting the temperature of the film to be kept at 90° C. The pinch rolls are 1 meter in length and are located 2 meters from the blow-extrusion device. The double-thickness film exiting from the pinch rolls immediately passes between a pressure roll and an embossing roll having a length of 1 meter. The pressure roll is rubber-shod, and the embossing roll is stainless steel having diamond-shaped patterns with 1 mm sides incised on its surface. The temperature of the film at the embossing roll is kept at 70° C. by means by internal coiled tubes in the embossing roll. Exiting from the embossing roll is a sealed, embossed film having a thickness of 15 microns.

EXAMPLE 2

A copolymer is formed by copolymerizing 74% by weight ethylene and 26% by weight propylene in the presence of a Ziegler catalyst. The resulting copolymer has a density of 0.908 g/cm$^3$, a melt index of 1.9 dg/mn, a proportion of methyl groups of 58%, a number average molecular weight of 15,500, and a ratio Mw/Mn=8.7.

The aforementioned copolymer, to which is added 6% by weight titanium dioxide, is converted into a 12 micron thick tubular web by blow-extrusion at a speed of 100 m/mn. The temperature of the tubular web at the outlet of the tubular die of the blow-extrusion device is 200° C. The tubular web then passes between a rubber-shod pressure roll and an embossing roll of the type described in Example 1. These rolls are 2 meters in length, and are located 8 meters from the blow-extrusion die. The temperature of the film at the embossing roll is 60° C. from the embossing roll is a sealed, embossed film having a thickness of 24 microns. This film is particularly well suited for the manufacture of baby's diapers.

EXAMPLE 3

An admixture containing 80 parts by weight of an ethylene-propylene copolymer of Example 2, 20 parts by weight of a radical ethylene polymer, and 6 parts by weight of titanium dioxide is formed into a tubular web by blow-extrusion and embossed under the same conditions as set forth in Example 2. The resulting sealed, embossed film has a thickness of 24 microns, is very flexible, and is resistant to tearing.

It will be apparent to those skilled in the art that various modifications and variations can be made in the present invention without departing from the scope or spirit of the invention.

What is claimed is:

1. An embossed film comprising an ethylene-propylene copolymer, said embossed film having a thickness of less than or equal to 24 microns, and said ethylene-propylene copolymer having a density ($\rho$) between 0.900 and 0.935 g/cm$^3$, a melt index between 0.4 and 2 dg/mn, a proportion (m) of methyl groups between 22 and 62 per 1000 carbon atoms, and wherein $\rho$ and m are such that $0.9534 \leq \rho + 0.83m \leq 0.9568$.

* * * * *